United States Patent [19]
Gold

[11] Patent Number: 5,786,948
[45] Date of Patent: Jul. 28, 1998

[54] SIDE VIEW MIRROR AND METHOD OF ASSEMBLY THEREOF

[76] Inventor: Peter Gold, 465 N. Wood Rd., Rockville Centre, N.Y. 11570

[21] Appl. No.: 631,995

[22] Filed: Apr. 15, 1996

[51] Int. Cl.$^6$ .................... G02B 5/08; G02B 7/182
[52] U.S. Cl. .................... 359/838; 359/872
[58] Field of Search .................... 359/872, 876, 359/838, 514, 604; 248/479

[56] References Cited

U.S. PATENT DOCUMENTS

| | | | |
|---|---|---|---|
| 4,193,243 | 3/1980 | Tiner | 52/514 |
| 4,311,656 | 1/1982 | Spriggs | 264/36 |
| 5,436,769 | 7/1995 | Gilbert et al. | 359/874 |
| 5,555,137 | 9/1996 | Whiting | 359/872 |

*Primary Examiner*—Paul M. Dzierzynski
*Assistant Examiner*—Mark A. Robinson
*Attorney, Agent, or Firm*—Galgano & Burke

[57] ABSTRACT

A side view mirror includes a housing which surrounds and protects a rearwardly facing mirror which is pivotally adjustable therein. Specifically, the mirror attaches to a perforated mirror support which pivotally attaches to a ball-shaped end of a stem. An opposite end of the stem threadably attaches to an anchor plate which is adhesively secured to the housing. Also, disclosed is a method of repairing an adjustable side view mirror. The method includes the steps of, removing a mirror and an internal mechanism from a housing of an adjustable side view mirror, attaching a mirror assembly inside the housing with an adhesive, and positioning an edge of a mirror of the mirror assembly in spaced-apart relation from a surrounding wall of the housing while the adhesive cures. Also, disclosed is kit for replacing the internal mechanism of an adjustable side view mirror. The kit includes a mirror assembly having an anchor plate, a mirror, a mirror support, and a connecting stem. Preferably, the kit further includes a plurality of spacers and an adhesive.

11 Claims, 2 Drawing Sheets

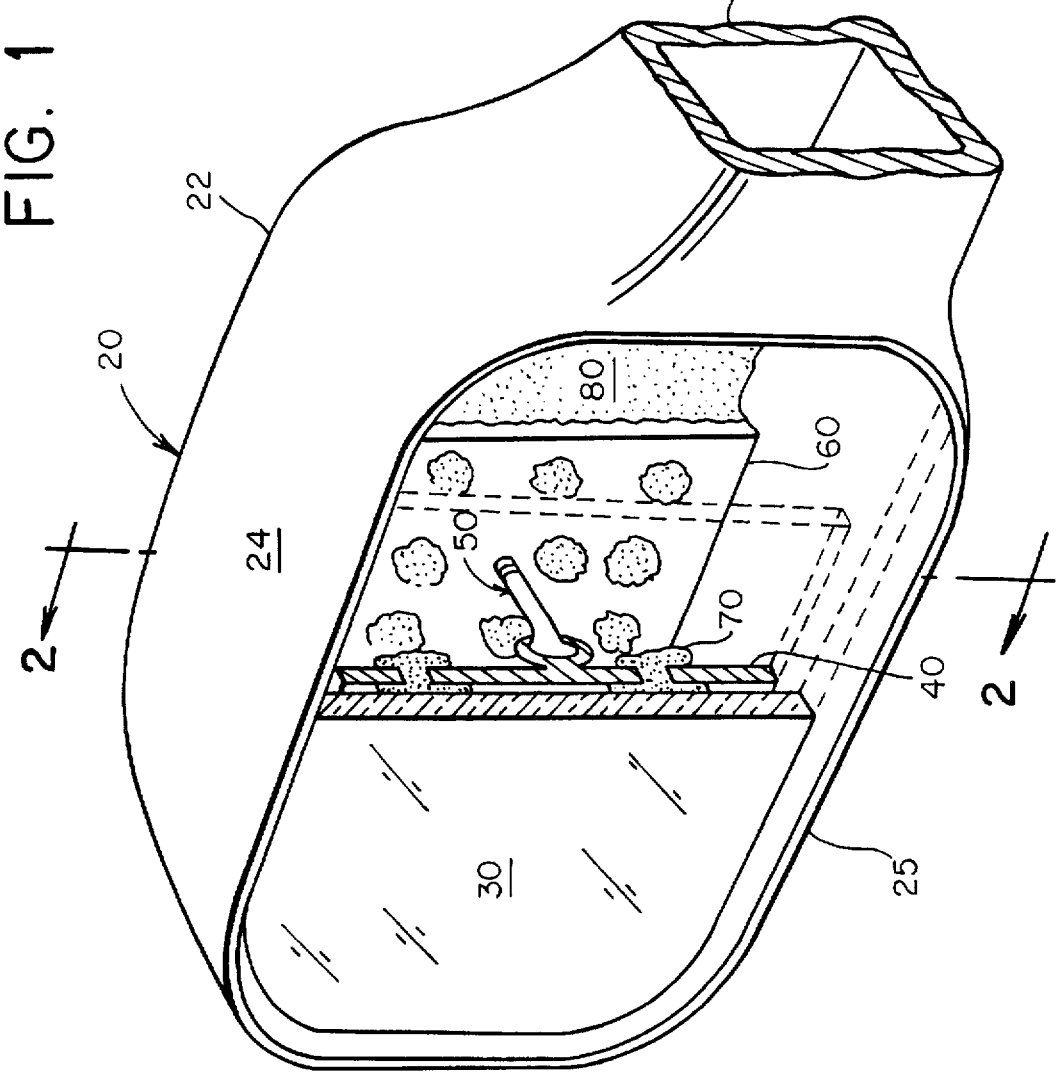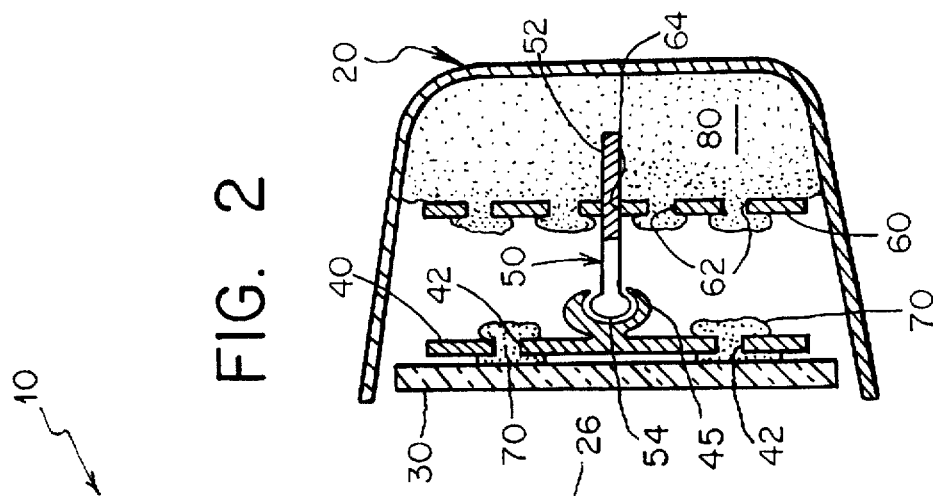

SIDE VIEW MIRROR AND METHOD OF ASSEMBLY THEREOF

BACKGROUND OF THE INVENTION

The present invention relates generally to side view mirrors. More particularly, this invention relates to an adjustable side view mirror and method of assembly thereof for repair and/or replacement of inoperable and/or damaged adjustable, and particularly remotely adjustable, side view mirrors.

Today, most vehicles such as automobiles and trucks are equipped with side view mirrors which can be adjusted remotely from inside the vehicle. Such remotely adjustable side view mirrors generally include a housing having a mirror disposed therein. The mirror is operably supported by a mechanism which is actuated or controlled via a control knob by an operator from inside the vehicle. The control knob is typically attached to the ends of three separate cables which attach at the opposite ends to a mechanism for moving the mirror up, down, and from side to side. In some versions, the control knob is an electronic button operably connected to a motor which operates the three cables.

It is estimated that more than one million remotely adjustable side view mirrors are replaced every year in the United States. With the average cost to the consumer of more than one hundred dollars per replacement, this market accounts for more than one hundred million dollars a year. About fifty per cent of this market is replacement of remotely adjustable side view mirrors in which the entire housing is fractured and damaged by side-impact collisions, sideswipes and other related accidents. The remaining market is replacement of damaged and/or inoperable internal mechanisms of such side view mirrors.

There is a need for a side view mirror and method of assembly thereof enabling low cost replacement and/or repair of adjustable side view mirrors, and particularly remotely adjustable side view mirrors, in which the mirror is no longer operable.

SUMMARY OF THE INVENTION

Accordingly, it is an object of the present invention to provide a novel side view mirror for replacement of adjustable side view mirrors which are damaged in side-impact collisions, sideswipes and other related accidents.

It is another object of the present invention to provide a side view mirror for replacement of adjustable side view mirrors in which the internal mechanism for adjusting the mirror is no longer operable.

It is also another object of the present invention to provide a novel method of repair of the internal mechanisms in adjustable side view mirrors which are no longer operable.

It is still another object of the present invention to provide a novel kit for replacement of the internal mechanisms in adjustable side view mirrors which are no longer operable.

Certain of the foregoing and related objects are readily obtained in a side view mirror comprising a housing, an anchor plate, first adhesive means for attaching the anchor plate inside the housing, a mirror, a mirror support, second adhesive means for attaching the mirror to the mirror support and means for connecting the mirror support to the anchor plate so that the mirror is pivotally adjustable in the housing.

The attachment means comprises a stem having a first end attachable to the anchor plate and an opposite second end pivotally attachable to the mirror support. Preferably, the first end of the stem is threaded and the second end of the stem is ball-shaped. Further, the anchor plate is perforated and comprises an aperture for receiving the threaded first end of the stem, and the mirror support is perforated and comprises a socket for pivotally attaching to the ball-shaped second end of the stem. Desirably, the first and second adhesive means is a urethane adhesive.

Certain of the foregoing and related objects are also readily obtained in a method of repair of an adjustable side view mirror, having a housing, a mirror, and an internal mechanism for adjusting the mirror. The method comprises the steps of removing a mirror and an internal mechanism from a housing of an adjustable side view mirror, attaching a mirror assembly inside the housing with an adhesive in which the mirror assembly includes an anchor plate, a mirror support attached to a mirror, and means for connecting the mirror support to the anchor plate so that the mirror is pivotally adjustable, and positioning the mirror in spaced-apart relation from a surrounding wall of the housing while the adhesive cures. Preferably, the step of removing a mirror and internal mechanism further comprises the step of cutting at least one remote control cable extending into the housing.

Desirably, the step of attaching the mirror assembly inside the housing further comprises the step of applying an adhesive to at least one of a surface inside the housing and the anchor plate. Advantageously, the step of attaching the mirror assembly inside the housing further comprises the step of pressing the anchor plate of the mirror assembly into an adhesive applied inside the housing.

The step of positioning the mirror of the mirror assembly in the housing preferably comprises the step of inserting a plurality of temporary spacers between an outer edge of the mirror and an inside surface of the housing.

Certain of the foregoing and related objects are readily obtained in a kit for replacing the internal mechanism of an adjustable side view mirror. The kit comprises an anchor plate for attaching inside a housing of an adjustable side view mirror, a mirror, a mirror support for attaching to a rear surface of a mirror, and means for connecting the mirror support to the anchor plate so that the mirror is pivotally adjustable.

The attachment means comprises a stem having a first end attachable to the anchor plate and an opposite second end pivotally attachable to the mirror support. Preferably, the first end of the stem is threaded and the second end of the stem is ball-shaped. Further, the anchor plate is perforated and comprises an aperture for receiving the threaded first end of the stem, and the mirror support is perforated and comprises a socket for pivotally attaching to the ball-shaped second end of the stem.

Desirably, the kit further comprises a plurality of temporary spacers for positioning an edge of a mirror in spaced-apart relation from a surrounding wall of the housing and an adhesive for attaching the anchor plate to the housing and for attaching the mirror to the mirror support.

BRIEF DESCRIPTION OF THE DRAWINGS

Other objects and features of the present invention will become apparent from detailed description considered in the connection with the accompanying drawings, which disclose several embodiments of the present invention. It is to be understood that the drawings are to be used for the purposes of illustration only and not as a definition of the limits of the invention.

In the drawings, wherein similar reference characters denote similar elements throughout the several views:

FIG. 1 is a perspective view of an adjustable side view mirror embodying the present invention, with portions broken away to show internal construction;

FIG. 2 is a cross-sectional view taken along line 2—2 in FIG. 1;

DETAILED DESCRIPTION OF A PREFERRED EMBODIMENT

Figures 3, 4:
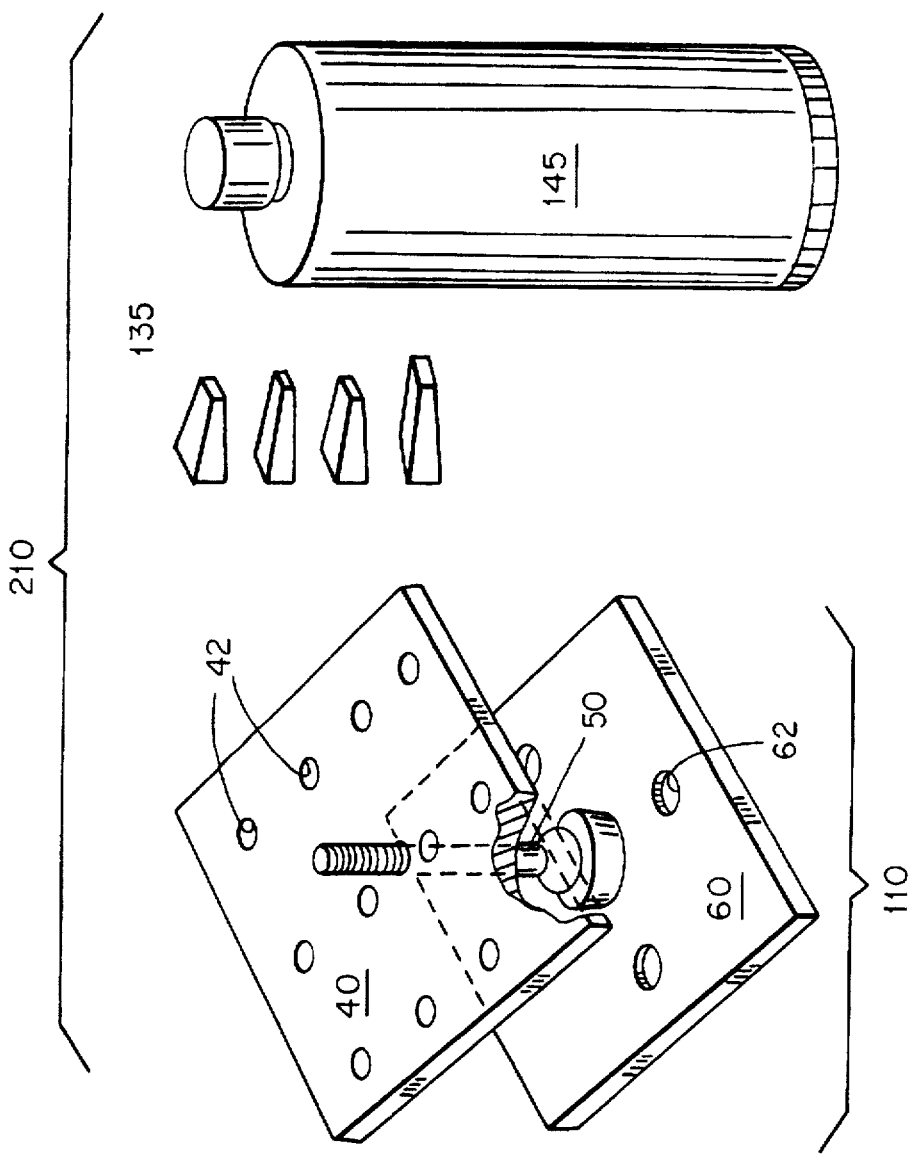
FIG. 3 is a cross-sectional view, similar to FIG. 2, of the adjustable side view mirror illustrating a method of the present invention.
FIG. 4 is a view of a kit embodying the present invention for repair of an adjustable side view mirror.

Turning now to the drawings, therein illustrated in FIG. 1 is a novel side view mirror 10 embodying the present invention which generally comprises a housing 20 which surrounds and protects a rearwardly facing mirror 30 which is pivotally supported therein. In particular, mirror 30 attaches to a mirror support 40 which pivotally attaches to a stem 50. Stem 50 attaches to an anchor plate 60 which is secured to housing 20. Side view mirror 10 provides a low cost replacement for damaged and/or inoperable adjustable vehicle side view mirrors.

Specifically, housing 20 comprises a front wall 22 and a surrounding wall 24. A rear edge 25 of surrounding wall 24 defines an opening through which mirror 30 is visible. A neck portion 26 of surrounding wall 24 operably attaches to a side of a motor vehicle (not shown).

Mirror support 40 is sized to attach to a rear surface of mirror 30. As shown best in FIG. 2, mirror support 40 is perforated and has a plurality of apertures 42 extending therethrough. Preferably, an adhesive 70 attaches mirror 30 to mirror support 40. Adhesive 70 passes through apertures 42 to better attach and secure mirror support 40 to mirror 30; i.e., the cured adhesive forming a mechanical "interlock" with perforated mirror support 40 (see, U.S. Pat. No. 5,429,858 to Gold, the subject matter of which is incorporated herein by reference thereto).

Anchor plate 60 is sized to fit in housing 20 and preferably attach to a rear surface of front wall 22 of housing 20. As shown best in FIG. 2, anchor plate 60 is also perforated and has a plurality of apertures 62 therethrough. Preferably, an adhesive 80 is disposed on the rear surface of housing 20 to attach and support anchor plate 60 in a generally parallel, spaced-apart relation from front wall 22 of housing 20. Advantageously, adhesive 80 passes through apertures 62 in anchor plate 60 to better attach and secure anchor plate 60 to housing 20 by forming a mechanical interlock therewith upon curing.

With reference to FIG. 2, stem 50 includes a first end 52 which attaches to anchor plate 60 and an opposite second end 54 which pivotally attaches to mirror support 40. Specifically, end 52 of stem 50 has external threads which are receivable in an internally threaded aperture 64 in anchor plate 60. Second end 54 of stem 50 is ball-shaped and receivable in a socket 45 of mirror support 40. Desirably, second end 54 and socket 45 are sized to frictionally remain secured in a set position but allow pivotal adjustment by an operator of the vehicle. Advantageously, socket 45 can include an elastic material (not shown) which contacts ball-shaped end 54 to better frictionally secure mirror support 40 in a set position.

Another embodiment of the present invention is directed toward a method of repairing an adjustable side view mirror, and in particular, replacing an internal mechanism of an adjustable side view mirror. With reference to FIG. 3, the method initially comprises the step of removing a mirror and internal mechanism (not shown) from housing 20 of an adjustable side view mirror. In addition, for remotely adjustable side view mirrors, preferably three cables 90 which attach to a remote control knob or electronic button/motor (not shown) are cut adjacent surrounding wall 24 inside housing 20.

With the inside of housing generally empty, a mirror assembly 110 is provided and attached to the inside of housing 20. Mirror assembly 110 generally includes perforated mirror support 40 pivotally connected to perforated anchor plate 60 via stem 50. As similarly described above with reference to the illustrated embodiment of FIGS. 1 and 2, anchor plate 60 attaches to first end 52 of stem 50 and mirror support 40 attaches to second ball-shaped end 54 of stem 50. Preferably, mirror 30 is attached to mirror support 40.

Adhesive 80 is applied to the inside of housing 20 preferably along a rear surface of front wall 22 of housing 20 and anchor plate 60 of mirror assembly 110 is pressed into adhesive 80 until adhesive 80 is squeezed out through apertures 62. It is appreciated that adhesive 80 can be applied to anchor plate 60 of mirror assembly 110 and adhesive 80 subsequently contacted with the rear surface of front wall 22 housing 20.

Mirror assembly 110 is then positioned within housing 20 while adhesive 80 cures. In particular, an outer edge of mirror 30 is positioned in spaced-apart relation from the inside surface of surrounding wall 24 of housing 20. Preferably, a plurality of temporary spacers 135 are inserted between the outer edge of mirror 30 and the inside surface of surrounding wall 24 of housing 20 to maintain mirror 30 in the desired position until adhesive 80 cures.

Still another embodiment of the present invention is directed toward a kit for replacing an internal mechanism of an adjustable side view mirror. As illustrated in FIG. 4, a kit 210 which includes mirror assembly 110 having anchor plate 60, mirror support 40, and means for connecting mirror plate 40 to anchor plate 60, such as stem 50, so that a mirror (not shown in FIG. 4) which is attached to mirror support 40 is pivotally adjustable thereon.

Mirror assembly 110 is described in greater detail above with reference to FIG. 3. Desirably, kit 210 includes at least one mirror (shown in FIG. 1) which attaches to mirror plate 40. Advantageously, kit 210 includes an adhesive or tube of adhesive 145 for attaching anchor plate 60 to a housing and for attaching mirror support 40 to a mirror. Preferably, the adhesive is a urethane adhesive. Also desirably, kit 210 includes a plurality of spacers 135 for positioning an edge of a mirror in spaced-apart relation from a surrounding wall of the housing. Preferably, spacers 135 are wedge-shaped, although other configurations would be suitable, e.g., conical-shaped.

As previously noted and shown best in FIG. 1, mirror 30 is attached via adhesive 70 to mirror support 40 which is movably supported on stem 50, which, in turn, is threadably secured to anchor plate 60. Anchor plate 60 is, in turn, secured to housing 20 by adhesive 80. This mounting method provides:

(a) retention of threaded end 52 of stem 50 both mechanically and adhesively (its end is received in adhesive 80);

(b) reduction of the transfer of vibration to the anchor plate 60, stem 50, and mirror support 40 via adhesives 70 and 80 which dissipate vibrations from housing 20; and (c) a "mechanical" interlock of adhesives 70 and 80 to retain both anchor plate 60 to housing 20 and mirror 30 to mirror support 40.

Side view mirror 10 thus provides not only a low cost replacement for damaged and/or inoperable adjustable vehicle side view mirrors but additionally provides a far superior system that may reduce vibration even more than the costly original mirror internal assembly provided as original equipment by the vehicle manufacturer.

In addition, the multi-redundant "mechanical and adhesive" interlock system is also intended to reduce the likelihood of the mirror assembly from becoming detached even after extended use.

Indeed, the inventive assembly would be especially suitable for vehicles such as race cars, construction vehicles, etc., which are subject to extraordinary vibration resulting in blurred unsteady mirrors. In particular, a mirror assembly that is adhesively attached absorbs and reduces vibration as explained above, and equally important, does not become unscrewed since the adhesive makes obsolete not only the screws, nuts, bolts and rigid fastening systems, but also the labor to torque the screws, nuts, bolts and rigid fastening parts which become detached and/or inoperable via vibration, shock loads, etc.

Thus, while only several embodiments of the present invention have been shown and described, it is appreciated that many changes and modification may be made thereunto without departing from the spirit and scope of the invention.

What is claimed is:

1. A kit for replacing an internal mechanism inside a housing of an adjustable side view mirror, the kit comprising:

an anchor plate for attaching to the inside of the housing of the adjustable side view mirror, said anchor plate comprising at least one hole;

a mirror;

a mirror support for attaching to the rear surface of said mirror;

means for connecting said mirror support to said anchor plate so that said mirror is pivotally adjustable; and a plurality of temporary spacers for temporarily positioning an edge of said mirror in spaced-apart relation from the inside of the housing when attaching said anchor plate to the housing.

2. A kit according to claim 1, wherein said attachment means comprises a stem having a first end attachable to said anchor plate and an opposite second end pivotally attachable to said mirror support.

3. A kit according to claim 2, wherein said first end of said stem is threaded and said second end of said stem is ball-shaped, wherein said anchor plate is perforated and comprises an aperture for receiving said threaded first end of said stem, and wherein said mirror support is perforated and comprises a socket for pivotally attaching to said ball-shaped second end of said stem.

4. A kit according to claims 1, further comprising an adhesive for attaching at least one of said anchor plate to the housing and said mirror to said mirror support.

5. A method of repair of an adjustable side view mirror comprising a housing, a mirror, and an internal mechanism for adjusting the mirror, the method comprising the steps of:

removing a mirror and an internal mechanism from a housing of an adjustable side view mirror;

attaching a mirror assembly inside the housing with an adhesive, said mirror assembly comprising an anchor plate, a mirror support attached to a mirror, and means for connecting said mirror support to said anchor plate so that said mirror is pivotally adjustable; and positioning said mirror in spaced-apart relation from a surrounding wall of the housing while said adhesive cures.

6. A method according to claim 5, wherein said step of removing a mirror and internal mechanism further comprises the step of cutting at least one remote control cable extending into the housing.

7. A method according to claim 5, wherein said step of attaching said mirror assembly inside the housing further comprises the step of applying an adhesive to at least one of a surface inside the housing and said anchor plate.

8. A method according to claim 5, wherein said step of attaching said mirror assembly inside the housing further comprises the step of pressing said anchor plate of said mirror assembly into an adhesive applied inside the housing.

9. A method according to claim 5, wherein said step of positioning said mirror of said mirror assembly in the housing comprises the step of inserting a plurality of temporary spacers between an outer edge of said mirror and an inside surface of the housing.

10. A method according to claim 5, wherein said anchor plate comprises at least one hole.

11. A method according to claim 10, wherein said adhesive extends through said at least one hole to form a mechanical interlock to attach said mirror assembly inside the housing.

* * * * *